United States Patent [19]
Wang et al.

[11] Patent Number: 5,602,228
[45] Date of Patent: Feb. 11, 1997

[54] NICKEL PHOSPHATE CATALYSTS

[75] Inventors: Ying Wang, Diamond Bar; Matthew L. Marrocco, III, Santa Ana; Mark S. Trimmer, Monrovia, all of Calif.

[73] Assignee: Maxdem Incorporated, San Dimas, Calif.

[21] Appl. No.: 467,099

[22] Filed: Jun. 6, 1995

[51] Int. Cl.$^6$ .......................... C08G 61/00; C08G 61/02; C07C 1/26
[52] U.S. Cl. .......................... 528/397; 528/398; 585/427
[58] Field of Search .................................. 528/397, 398; 585/427

[56] References Cited

U.S. PATENT DOCUMENTS

| | | | |
|---|---|---|---|
| 4,326,989 | 4/1982 | Colon et al. | 252/429 |
| 5,196,625 | 3/1993 | Threlkel et al. | 585/513 |
| 5,496,893 | 3/1996 | Gagné et al. | 525/50 |
| 5,512,695 | 4/1996 | Kreutzer et al. | 558/338 |
| 5,532,374 | 7/1996 | Lee et al. | 546/167 |

OTHER PUBLICATIONS

Colon et al, "Coupling of Aryl Chlorides by Nickel and Reducing Metals," *J. Org. Chem.* 1986, vol. 51, No. 14, pp. 2627–2637.

*Primary Examiner*—Jeffrey C. Mullis
*Attorney, Agent, or Firm*—Christie, Parker & Hale, LLP

[57] ABSTRACT

Methods for coupling aryl halides or aryl sulfonates to produce biaryls or polyaryls using novel nickel phosphite catalysts are provided.

44 Claims, No Drawings

NICKEL PHOSPHATE CATALYSTS

FIELD OF THE INVENTION

This invention relates to nickel phosphite catalysts for coupling aryl halides or aryl sulfonates to produce biaryls or polyaryls.

BACKGROUND OF THE INVENTION

The coupling of aryl compounds to form biaryl compounds or polyaryl compounds via carbon-carbon bonds is of great synthetic importance. A large number of methods are known to effect such couplings, including Ullman couplings of aryl iodides and bromides (see P. E. Fanta, "The Ullman Synthesis of Biaryls," Synthesis, 9, 9–21, 1974), coupling of aryl bromides and iodides with aryl boronic acids and esters using palladium catalysts (A. Suzuki, Acc. Chem. Res., 15, 178, 1982), reductive coupling of aryl halides with magnesium via Grignard reagents using nickel catalysts (T. Yamamoto and A. Yamamoto, Chem. Left., 353–356, 1977), reductive coupling of aryl chlorides with zinc using nickel triphenylphosphine catalysts (I. Colon and D. R. Kelsey, J. Org. Chem., 51, 2627–2637, 1986; and U.S. Pat. No. 4,326,989) and oxidative coupling of phenols using iron (III) or air and copper catalysts (L. F. Fieser and M. Fieser, Reagents for Organic Synthesis, Vol. 1, 390, 1967).

Each of the above-referenced prior art methods for the coupling of aryl compounds has certain limitations. The Ullman coupling generally results in low yields and, for best results, requires aryl iodides, which are expensive. Although coupling of aryl chlorides, which are less expensive than aryl iodides and aryl bromides, has been accomplished by Yamamoto et al via Grignard reagents, the generally more expensive aryl bromides and iodides are preferred. In addition, in the Yamamoto et al coupling reactions, groups such as ketones and esters, which are not stable to Grignard conditions, must be avoided, thereby limiting the scope of useful reactions. While the Suzuki coupling is the method of choice for cross-coupling to form asymmetric biaryls, it uses expensive palladium catalysts and boronic acid substrates, which makes the process more expensive and, hence, less desirable.

Because aryl chlorides cost substantially less than aryl bromides and aryl iodides, the nickel phosphine catalyzed couplings disclosed by Colon et al are widely used. In the Colon et al method, a nickel compound, salt, or complex is reduced in situ with zinc powder in the presence of a phosphine (specifically a triaryl phosphine) to form an active nickel (O) phosphine catalyst. It is theorized that in the triarylphosphine process, each of the nickel species in the catalytic cycle is capable of losing one or more of its phosphine ligands (L) to form coordinatively unsaturated complexes. These equilibria have been studied by Tolman (C. A. Tolman, W. C. Seidel, and L. W. Gosser, J. Am. Chem., 96, 53 (1974)). The formation f unsaturated complexes is said to be essential at certain parts of the cycle, so that the aryl halide may react. However, during other parts of the cycle, unsaturated nickel complexes may cause the formation of unwanted by-products or may react to form inert complexes unable to catalyze further coupling. It has been found in using the Colon et al process that the concentration of phosphine ligand must be kept between certain limits to prevent the formation of unsaturated nickel complexes which are too reactive and which lead to unwanted side reactions. The typical range of concentrations is approximately 0.2 to 0.5 M triphenylphosphine, 0.5 to 1 M aryl halide, and 0.01 to 0.05 M nickel.

In view of the foregoing, it can be seen that in the Colon et al. process relatively large amounts of triphenylphosphine must be used in coupling reactions compared to the amount of aryl halide substrate. Since such large amounts of triphenylphosphine must be used, recovery and purification of triphenylphosphine is required to enhance process economics. Because of the inefficiencies involved in the recovery, the cost of the process is substantially increased.

In addition to the increased cost of the Colon et al process due to the loss of triphenylphosphine, such processes also result in unwanted by-products due to abstraction of an aryl group (Ar') from the phosphine P(Ar')$_3$. The abstracted aryl group can couple to aryl halide (ArX), giving an undesired by-product Ar—Ar', for example. While increasing the concentration of phosphine ligand can suppress (but not eliminate) this undesired side reaction, increasing the phosphine concentration further increases the loss of triphenylphosphine, thereby increasing the overall process cost.

Aryl sulfonates react in a fashion similar to aryl halides and may be coupled using nickel phosphine catalysts such as that of Colon et al., for example, see the work of Percec et al. (V. Percec, J-Y. Bae, M. Zhao, and D. H. Hill, J. Org. Chem., 1995, 60, 176–185; and U.S. Pat. No. 5,241,044, issued Aug. 31, 1993.)

There is a need in the art for economical catalyst systems which can be used in reactions which couple aryl halides or aryl sulfonates to form either biaryl or polyaryl compounds and which enhance the economics of the process while reducing or substantially eliminating by-product formation.

SUMMARY OF THE INVENTION

An economical method for coupling aryl halides or aryl sulfonates to form biaryl or polyaryl compounds is provided which minimizes by-product formation. The method comprises the steps of (1) providing an aryl sulfonate nonlimiting examples of which include an aryl methanesulfonate (aryl mesylate), an aryl trifluoromethanesulfonate (aryl triflate), an aryl phenylsulfonate, an aryl tolylsulfonate (aryl tosylate), an aryl fluorosulfonate, and an aryl fluorophenylsulfonate; or an aryl halide selected from the group consisting of an aryl chloride, an aryl bromide, and an aryl iodide, (2) contacting the aryl sulfonate or aryl halide in an anhydrous aprotic solvent with a catalyst mixture comprising a nickel compound or complex, a phosphite ligand, and a reducing metal to thereby form the biaryl or polyaryl compound.

The coupled products provided in accordance with this invention can be used, inter alia, as monomers for subsequent polymerization, as high boiling heating fluids, as plasticizers for plastics and as chemicals in pharmaceutical intermediates.

In one preferred embodiment of the present invention, the aryl halide has the formula:

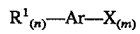

wherein X is independently selected from the group consisting of Cl, Br, and I; m is 1 or 2; and Ar is selected from the group consisting of:

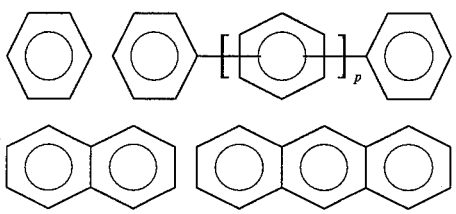

The aryl halide will have the general formulae:

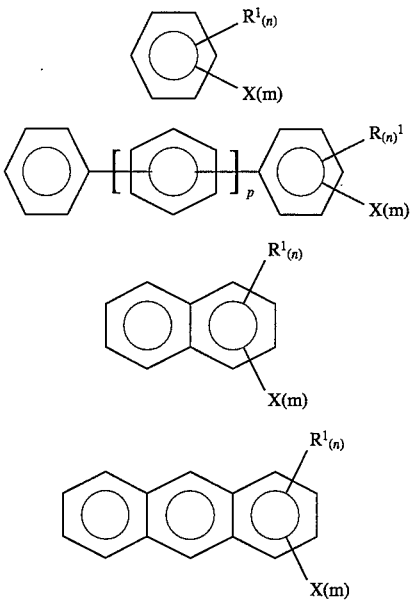

wherein p is 0–100, and $R^1$ is independently alkyl, alkene, aryl, alkoxy, aryloxy, amine, amide, fluoroalkyl, fluoroaryl, ketone, ester, formyl, cyano, fluoro, imide, sulfone, thioether, and the like. X and $R^1$ can be on any of the fused or multiple rings, and one to three CH units in any aromatic ring of each such Ar group can be replaced by a nitrogen atom. Any hydrogens of the aryl group may be substituted by $R^1$ substituents; therefore, n is 0–5 for phenyl, 0–7 for naphthyl, 0–9 for anthracenyl, 0–9 for biphenyl, and so on. Furthermore, where m=2, the two halides are at positions on the Ar group other than ortho to each other.

Other aryl halides that can be coupled in accordance with practice of the present invention will be apparent to one skilled in the art, including but not limited to binaphthyl halides, phenylnaphthyl halides, phenanthryl halides, branched aryl halides, such as triphenylbenzene halides, and the like. Additionally, the aryl halides may be heteroaryl halides, wherein each ring of the aryl group may have one to three nitrogen atoms. Non-limited examples of heteroaryl halides are 2-chloropyridine, 3-chloropyridine, 4-chloropyridine, haloquinolines, including the mono- and di-chloroqauinolines, haloquinazolines, haloquinoxalines, halopyrazines, and the like.

In one embodiment of practice of the present invention, the phosphite ligand has the formula:

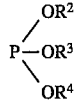

wherein $R^2$, $R^3$, and $R^4$ are independently selected from the groups consisting of $C_3$ to $C_{22}$ alkyl, $C_6$ to $C_{24}$ aryl, alkaryl, and aralkyl.

In another preferred embodiment of practice of the present invention of coupling aryl halides to form biaryl or polyaryl compounds, the aryl halide is contacted in an anhydrous aprotic solvent with a catalyst mixture comprising a nickel compound, a reducing metal and a ligand selected from the group consisting of:

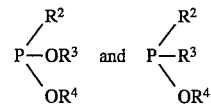

wherein $R^2$, $R^3$, and $R^4$ are as defined above, to thereby form said biaryl or polyaryl compound.

In yet another preferred embodiment of the present invention, a mixture comprising an aryl halide, a nickel compound or complex, and a phosphite ligand is prepared in an anhydrous aprotic solvent containing an electrolyte. The mixture is placed in an electrochemical cell comprising a cathode, and the aryl halide is cathodically reduced to form the biaryl or polyaryl compound.

The present invention also defines a catalyst composition useful for aryl halide or aryl sulfonate coupling reactions. The composition includes a nickel compound or complex, a phosphite ligand, and a reducing metal selected from the group consisting of aluminum, magnesium, and zinc, and an optional promoter selected from chloride, bromide and iodide salts, wherein the molar ratio of ligand to nickel is between 1 and 10, and the molar ratio of reducing metal to nickel is between 1 and 10,000.

DETAILED DESCRIPTION

This invention provides an efficient and economical method for coupling aryl halides or aryl sulfonates to form biaryl or polyaryl compounds. The method includes the steps of (1) providing an aryl sulfonate non-limiting examples of which include an aryl methanesulfonate (aryl mesylate), an aryl trifluoromethanesulfonate (aryl triflate), an aryl phenylsulfonate, an aryl tolylsulfonate (aryl tosylate), and an aryl fluorophenylsulfonate; or an aryl halide selected from the group consisting of an aryl chloride, an aryl bromide, and an aryl iodide, (2) contacting the aryl sulfonate or the aryl halide in an anhydrous aprotic solvent with a catalyst mixture comprising a nickel compound or complex, a phosphite ligand, an optional promoter selected from salts of chloride, bromide and iodide, and a reducing metal to thereby form the biaryl or polyaryl compound.

As used herein, the term "aryl halide" includes aryl groups with a single halide substituent, as well as those which include two halide substituents. When the aryl halide has one halide substituent, a biaryl compound is formed. When the aryl halide has two halide substituents, a polyaryl compound is formed.

Similarly, the term "aryl sulfonate" includes aryl groups with one or two sulfonate substituents. When the aryl sulfonate has one sulfonate substituent, a biaryl compound is formed. When the aryl sulfonate has two sulfonate substituents, a polyaryl compound is formed.

A key to the development of the process of the present invention was the surprising discovery that complexes of phosphites and nickel catalyze the reductive coupling of aryl halides. It was also surprisingly found (1) that the concentration of the phosphite ligand required to effectuate the aryl halide reactions is lower than the concentration of phosphine ligand when triarylphosphine catalyst systems are used, and (2) that constituent groups are not abstracted from the phosphite moiety into the aryl chloride substrate, as is the case with phosphine catalyst systems. Thus, the use of phosphite catalyst systems is more economical and results in less undesirable by-product than is the case when phosphine systems are used.

While not wishing to be bound by theory, the following catalytic cycle, where L is phosphite, is consistent with the known behavior of the catalyst systems of the present invention.

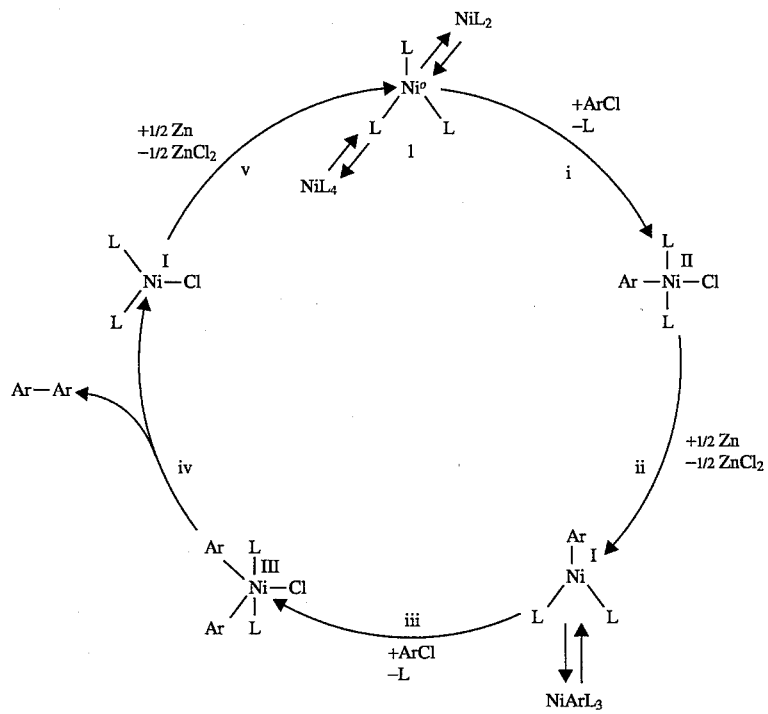

In the presence of the phosphite ligand L, the nickel salt, compound or complex that is added initially is reduced to a Ni(O) phosphite complex 1. The Complex 1 (the $NiL_3$) species is in equilibrium with the $NiL_4$ and $NiL_2$ species as shown. In step i, complex 1 oxidatively adds aryl halide to give a Ni(II) aryl complex. In step ii, the Ni(II) aryl complex is reduced by Zn (or other reducing agent) to give a Ni(I) complex which oxidatively adds a second aryl halide in step iii. Although it is not always shown explicitly, each Ni species in the cycle may add or lose ligand. Product biaryl is formed in step iv by reductive elimination to give a Ni(I) species which is reduced again to 1 in step v.

It is thought that the differing behaviors of the phosphine and phosphite ligands are probably related to the stability and reactivity of the Ni complexes. Phosphites are stronger pi acids than phosphines and give more stable complexes with low valent metals, such as nickel(O) but less stable complexes with higher valent metals, such as nickel(II). For example, it is known that tetrakistriphenylphosphite ($NIL_4$) nickel(O) is very stable. For nickel(II) the complex bis(triphenylphosphine)nickel(II)chloride is stable and isolable, but the corresponding triphenylphosphite nickel(II) complex is not.

In one preferred embodiment, phosphites useful in conducting the coupling reaction of the present invention have the general structural formula:

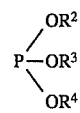

wherein $R^2$, $R^3$, and $R^4$ are independently selected from the group consisting of $C_3$ to $C_{22}$ alkyl, $C_6$ to $C_{24}$ aryl, alkaryl, and aralkyl.

In the definition of $C_6$–$C_{24}$ aryl groups, the number of carbons (C) refers to the carbons in the ring structure itself. For example,

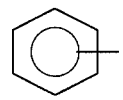

is a $C_6$ aryl;

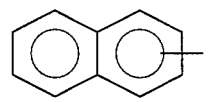

is a $C_{10}$ aryl; and

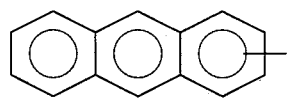

is a $C_{14}$ aryl.

Non-limiting examples of aryl groups $R^2$, $R^3$, and $R^4$ useful in the phosphite ligands of the present invention are as follows:

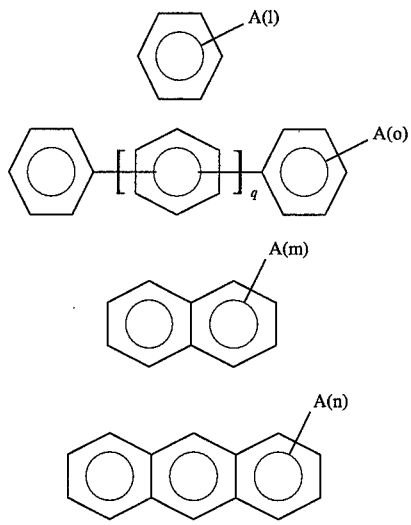

wherein A is independently selected from the group consisting of $C_1$–$C_{22}$ alkyl, $C_6$–$C_{18}$ aryl, $C_1$–$C_{12}$ alkoxy, $C_6$–$C_{18}$ aryloxy, and F, and wherein l=0–5, m=0–7, n=0–9, and o=0–21; the A groups can be on any of the fused or multiple rings; and q=0–3.

Preferred embodiments of phosphite ligands useful in practice of the process of the present invention include the following:

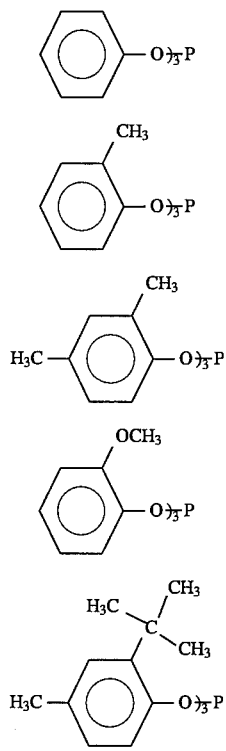

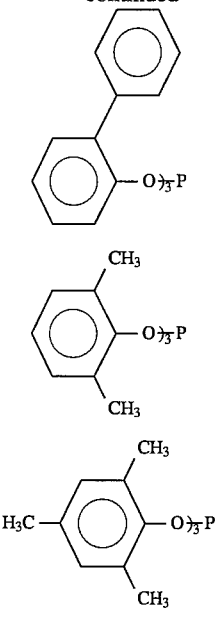

The phosphites having the structures shown above are known compounds, and in general the phosphites required for the catalysts of the present invention are readily synthesized by those skilled in the art from simple starting materials.

The size of the R groups on the phosphite ($P(OR)_3$) is an important consideration. If R is too small, e.g., methyl or ethyl, the Ni(O) complex will be too stable, and the catalyst will not be effective. Small R groups also favor dimeric Ni(O) and Ni(I) species which may not be catalytically active.

Additional phosphites with appropriate geometry useful in accordance with the present invention can be deduced using the rules of cone angles known in the art. Using the methods of Tolman et al to calculate cone angles, catalysts comprising phosphites having cone angles between about 120° and 185° will be effective catalysts. Preferably, the phosphite will have a cone angle between about 125° and 170°, more preferably between about 130° and 160°, and most preferably between about 135° and 150°. Tri-2-tolylphosphite, a preferred phosphite, has a cone angle of 141°. The Tolman et al paper is incorporated herein by this reference.

A phosphite may be tested for its coupling activity using the following protocol. Coupling reactions of 4-chlorotolulene are run using the general conditions set forth in Example 7 below, except that the amount of phosphite is adjusted to give phosphite to nickel (L/Ni) molar ratios of 2.01, 2.5, 3, and 4, and an internal standard such as biphenyl is added at the beginning of the reaction. The gas chromatograph (GC) yield of product dimethylbiphenyl is measured at 1, 2, 4, and 16 hours. Catalysts that give yields higher than approximately 10% for at least one combination of the L/Ni molar ratio and time are considered active. The dimethylbiphenyl yield should be 10%, preferably 20%, more preferably 50%, and most preferably at least 70%. Further experiments in which the temperature (in steps of about 10 to 20° C.), the substrate to nickel ratio molar ratio (in increments of about 25 to 50%), and the nickel concentration (in increments of about 20 to 40%) are varied can be used to optimize the time and yield of the reaction. These conditions may also need to be modified when the same phosphite ligand is used in coupling different substrates.

The aryl halides which may be coupled using methods of the present invention include aryl chlorides, aryl bromides, and aryl iodides. It was discovered that aryl fluorides are not reactive under the conditions of the process of the present invention. Aryl chlorides are preferred because they typically result in less side product produced by reductive replacement of the halide group with hydrogen. Additionally, aryl chlorides are usually less costly than aryl bromides or aryl iodides. Preferably, the aryl group does not bear substituents which react with the nickel catalyst or with the reductive metal. Such groups include nitro groups, free acid groups, or protic groups such as alcohol.

In a preferred embodiment, aryl halides which may be coupled using the methods of the present invention have the following general formula:

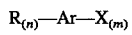

wherein X is independently selected from the group consisting of Br, Cl, I, m is 1 or 2, n is 0–10, and p is 0–100; Ar is selected from the group consisting of:

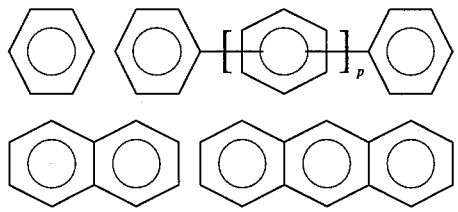

to provide aryl halides having the general structures:

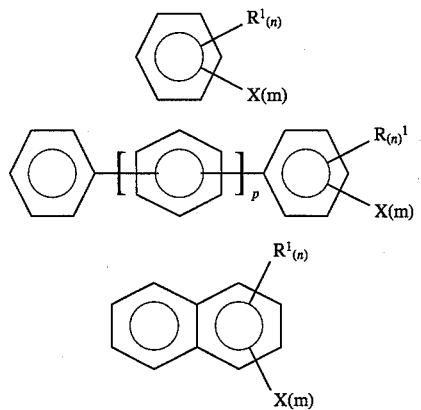

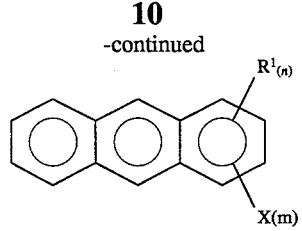

wherein p is 0–100; $R^1$ is independently alkyl, alkene, aryl, alkaryl, aralkyl, aryloxy, amine, amide (—NR'COR" or —CONR'R"), fluoroalkyl, fluoroaryl, ketone (including alkyl ketone and aryl ketone), ester (—CO$_2$R' or —OCOR'), formyl (—COH), cyano (—CN), fluoro, imide, sulfone (—SO$_2$R), and thioether (R' and R" are alkyl or aryl); wherein X and $R^1$ can be on any of the fused or multiple rings; wherein one to three CH units in any aromatic ring of each such Ar group can be replaced by a nitrogen atom, and where m=2, the two halides are at positions other than ortho to each other.

The aryl halides useful for coupling using the nickel phosphite catalysts of the present invention are either commercially available or readily synthesized by those skilled in the art. For example, chlorobenzoates, bromobenzoates, 2,3 and 4-chloroacetophenone, 2,3 and 4-chlorobenzophenone, 2,3 and 4-chlorobenzonitrile, 2,4-dichlorofluorobenzene, 2,5-dichlorotoluene, and the like are commercially available. Preparation of aryl chlorides and aryl dichlorides having ketone substituents may be accomplished by Friedel-Crafts acylation, as for example in U.S. Pat. No. 5,210,313, issued May 11, 1993, which discloses preparation of dichlorobenzophenones.

In one embodiment, the aryl halide has the formula:

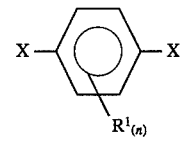

wherein X and $R^1$ are as defined above.

In another embodiment, the aryl halide has the formula:

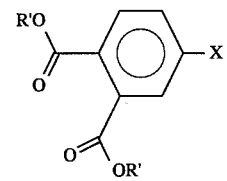

wherein X is as defined above and R' is alkyl or aryl.

In practice of the present invention, to form polyaryl compounds, aryl monohalides may be added to one or more aryl dihalides. The aryl monohalides act as endcappers and control the molecular weight of the polyaryl compound (the polymer) formed.

Non-limiting examples of $R^1$ groups are as follows:

alkyl groups are methyl, ethyl, propyl, isopropyl, tert-butyl, cyclohexyl, stearyl, and docosyl (—CH$_2$(CH$_2$)$_{20}$CH$_3$);

aryl groups are phenyl, biphenyl, naphthyl, anthracenyl, and diphenylphenyl;

alkaryl groups are o-tolyl, p-tolyl, m-tolyl, t-butylphenyl, dinonylphenyl, and poly(dioctylphenylene);

aryalkyl groups are phenytoctyl and naphthylmethyl;

C bound amides are N,N-dimethylaminocarbonyl (—CON(CH$_3$)$_2$), N,N-diphenylaminocarbonyl, piperidinecarbonyl (—CONCH$_2$CH$_2$CH$_2$CH$_2$CH$_2$), morpholinecarbonyl (—CONCH$_2$CH$_2$OCH$_2$CH$_2$), and N-methyl-N-phenylaminocarbonyl;

N bound amides are benzoylamino, N-methylacetylamino;

O bound esters are acetyloxy (—OCOCH$_3$) and benzoyloxy (—OCOC$_6$H$_5$);

C bound esters are methoxycarbonyl (—CO$_2$CH$_3$) and phenoxycarbonyl (—CO$_2$C$_6$H$_5$);

alkoxy groups are methoxy, neopentyloxy, and cyclohexyloxy;

aryloxy groups are phenoxy, naphthoxy, and biphenyloxy;

alkene groups are groups that include a double bond between two carbons of the group, for example vinyl and propenyl;

ketones are phenylketone (also called benzoyl), naphthylketone (naphthoyl), methylketone (acetyl), ethylketone (propionyl), tert-butylketone (pivaloyl), isobutylketone, trifluoromethylketone (trifluoroacetyl), methoxyethylketone, benzylketone, phenethylketone, 2,4,6-trimethylphenylketone, pyridinylketone (nicotinoyl), 2-quinolinoketone, and 2-thiopheneylketone;

imides are phthalimide, fluorophthalimide, and succinimide;

fluoroaryl groups are fluorophenyl and perfluorophenyl; and fluoroalkyl groups are trifluoromethyl, perfluoro butyl, and 2,2,2-trifluoroethyl.

In the reaction of the present invention, it is typically sufficient to maintain the phosphite ligand to nickel molar ratio in the range of about 2 to 10; preferably in the range of about 2.4 to 5; more preferably in the range of about 2.5 to 3.5; and most preferably in the range of about 2.8 to 3.2. It appears that the optimum ligand to nickel ratio is about 3. The useful range of ligand to nickel ratio depends on the size of the phosphite ligand. For small phosphites, such as triphenylphosphite, the nickel (O) tetrakisphosphite complex (NiL$_4$) is very stable, so that the phosphite to nickel ratio must be kept below about 4. For larger phosphites, such as tri-2-tolylphosphite, the NiL$_4$ complex is destabilized, and larger amounts of phosphite may be used; for example, up to 25 M equivalents of phosphite relative to nickel or higher may be used, although at these high levels, the reaction rate becomes slower.

In the systems of the present invention the amount of phosphite relative to nickel is substantially less than the concentration of phosphine to nickel in nickel phosphine catalyst systems. For example, while in the present systems the molar ratio of phosphite to nickel is less than 10 and often may be less than 4 or 5, the molar ratio of phosphine to nickel in nickel phosphine systems is usually 5 to 10 equivalents and excess phosphine improves yields.

It has been found that when using nickel/phosphite catalysts, the phosphite ligand concentration can be kept much lower than the phosphine ligand concentration when nickel/phosphine catalyst systems are used. Additionally, it has been found that the abstraction of aryl groups from the phosphite ligand is completely precluded. This reduces side reactions and resultant formation of contaminating by-products that result from abstraction of aryl groups when nickel phosphine catalyst systems are used. Apparently, nickel does not insert into the phosphite's O-aryl or P-O bonds as it does into P-aryl bonds of phosphines. It is this insertion of nickel (O) into the P-aryl bonds of phosphines, as has been described by D. R. Fahey and J. E. Mahan (J. Am. Chem. Soc., 98, 449 (1976)), which is a source of by-products in the nickel/phosphine catalyst systems.

An additional advantage of phosphite ligands is manifest during the work-up of the catalytic coupling product. Since alkyl and aryl phosphites are easily hydrolyzed and/or oxidized to water soluble phosphites and phosphates the product is readily cleansed of phosphite ligand by treatment with aqueous base. A similar process is not possible with phosphines which do not hydrolyze so easily.

In practice of this present invention, the nickel may be introduced into the reaction mixture in any form which can be reduced by the reducing agent to give a nickel(O) phosphite complex. Zero valent nickel/ligand complexes are also useful as long as the ligands are weak enough to be displaced by the phosphite ligands. Non-limiting examples of sources of nickel include nickel (II) chloride, bromide, iodide, acetate, acetoacetate, carbonate, sulfate, formate, toluene sulfonate, and similar salts. Nickel complexes such as bistriphenylphosphine nickel (II) chloride or trisbipyridyl nickel (II) may be used. Nickel compounds and complexes in the zero valent state may also be used including nickel (O) biscyclooctadiene, tetrakistriphenylphosphine nickel (O), nickel (O) ethylene tris(triarylphosphite), and the like. Most labile nickel compounds, i.e., nickel compounds where the Ni is free to exchange a ligand, may be used. Counter ions are not critical but should not be oxidants, such as nitrate, or react with low valent nickel or the reducing agent. The nickel compound will exchange its original ligands or anions for phosphite ligands to form soluble nickel phosphite complexes. The formation of the nickel phosphite complexes may require the presence of the reducing agent. Nickel compounds which bind nickel too tightly, such as nickel tetraphenylporphyrin, are not effective. Nickel (I) compounds, although rare, may also be used.

Suitable reducing metals for use in practice of the present invention are aluminum, manganese, zinc, and alkaline earths such as calcium and magnesium. The metal should be finely divided powders or dust, preferably with a particle size less than about 100 mesh, and more preferably with a particle size less than about 150 mesh. The metal powder should be activated by treatment with acid, followed by washing and drying. For example, highly active zinc powder is made by treating zinc dust (−350 mesh) with HCl in diethylether, washing, drying and resieveing (if necessary) to −150 mesh, where the minus sign (−) indicates that all powder which goes through the sieve is taken. Activated metals must be protected from air before use. Zinc powder activated using the procedure outlined in Example 1 set forth below is preferred.

Some reduction of substrate (i.e., replacement of halide by hydrogen) also occurs by way of nickel catalysis. Any water or protic solvent present, such as alcohols or acids, will lead to reduction. Even in anhydrous aprotic solvents, reduction may occur, especially with substrates which are slow to react, typically those containing electron donating groups like alkoxy and alkyl placed ortho or para to the halide.

It may not be possible to eliminate such reduction, and some minimum level of reduction of the substrate may have to be tolerated. In general, it has been found that catalysts with higher rates of product formation give less reduction. It is the relative rates of coupling and reduction that determine the product composition.

In another embodiment of practice of the present invention, the reducing equivalents may be supplied cathodically instead of by a reducing metal. The cathode should be an inert metal such as platinum or steel, or an inert non-metal conductor such as graphite. The solvent must contain an electrolyte, such as an alkali or alkaline earth halide, zinc halide, or alkylammonium halide. Most common electrolytes are acceptable, including but not limited to, alkali metal and alkaline earth metal salts, alkyl ammonium halides, and zinc halides. The electrolyte should be at least 0.01 M, preferably 0.1 M, and more preferably 1 M in concentration. The anode may be an inert metal or conductor such as platinum or carbon respectively, or a sacrificial anode such as zinc or tin. The appropriate range of applied potential or controlled current will be apparent to one skilled in the art. In general, the current will be controlled from about 10 ma/cm$^2$ to about 2 A/cm$^2$, preferably between about 100 ma/cm$^2$ to 1 A/cm$^2$, and more preferably between about 200 ma/cm$^2$ to about 600 ma/cm$^2$.

A divided cell is not necessary; however, anodic products are more easily separated in a divided cell. Where it is advantageous to avoid contamination of the product by the oxidized form of the reducing agent, electrochemical coupling in a divided cell is the method of choice. The usual principles of electrochemistry apply. Electrochemical techniques are generally preferred at small scale production. In some cases, electrochemical methods give better control over by-product formation since reduction potentials may be set to values not available with chemical reducing agents.

Preferably, a promoter is included in the catalyst system of the present invention. Useful promoters are chloride, bromide and iodide ions. The promoter ions may be introduced as alkali or alkaline earth salts, alkylammonium salts, or aluminum, manganese or zinc salts. Bromide and iodide salts are preferred. The amount of promoter may range from 0.01 M to 1 M, preferably from 0.1 M to 0.5 M, and most preferably from 0.2 M to 0.4 M. Other promoters useful in practice of the present invention include sulfate, sulfonate, phosphate, and phosphonate salts of alkali or alkaline earth metals, $Al^{+++}$, $Mn^{++}$, $Zn^{++}$, or alkyl ammonium. Bidentate aromatic heterocyclic ligands such as bipyridyl, phenanthroline, and the like can also be used as promoters.

The reaction solvents should be aprotic and must dissolve the nickel phosphite catalyst to at least 0.0001 M in nickel, preferably to at least 0.001 M in nickel, and most preferably to at least 0.01 M in nickel. Polar solvents are preferred, including but not limited to dimethylsulfoxide (DMSO), sulfolane, N-methylpyrrolidinone (NMP), N,N-dimethylacetamide (DMAC), N-cyclohexylpyrrolidinone, dimethylformamide (DMF), N,N,N,N-tetramethylurea, and the like. These solvents can be mixed with other aprotic solvents such as benzene, butyrolactone, cyclohexane, diglyme, heptane, propylenecarbonate, tetrahydrofuran, toluene, xylenes, and other saturated aliphatic hydrocarbons, aromatic hydrocarbons, or ethers.

The solvents useful in accordance with the present invention are preferably anhydrous. The presence of water leads to reductive replacement of the halide group with hydrogen, and to deactivation of the catalyst. The concentration of water should be kept below 1000 ppm, preferably below 500 ppm, more preferably below 100 ppm, and most preferably below 50 ppm. The concentration of water may be reduced further to 40 ppm, 30 ppm, or even 20 ppm or 10 ppm, to avoid possible side reactions involving water. Water may be reduced to these levels, for example, by addition of activated molecular sieves, or by other methods known in the art.

The reaction temperature for coupling should typically be from about 0° C. to about 120° C. The temperature may be adjusted to optimize the product yield, for example, temperatures of 50° C., 70° C., 90° C., or 100° C. may be preferred for a particular substrate.

The reaction pressure is not critical. Either elevated or reduced pressure may be used as required. The reaction must be carried out under inert atmosphere, typically nitrogen. Other inert gases such as helium, argon, and the like may also be used.

Reaction time is dependent on temperature, concentration of catalyst and reactants, and amount of promoter. Reaction time is typically between 2 and 24 hours. There is usually no maximum reaction time since the product is usually inert to the catalyst.

The following examples are illustrative of the present invention but are not considered limiting thereof in any way.

EXAMPLE 1

Preparation of Activated Zinc Dust

Activated zinc dust is obtained after 2 washings of commercially available 325 mesh zinc dust with 1 M hydrogen chloride in diethyl ether (anhydrous) followed by 2 washings with diethyl ether (anhydrous) and drying in vacuo or under inert atmosphere for several hours at about 100 14 200° C. If clumps form during drying the zinc dust is re-sieved to −150 mesh. This material should be used immediately or stored under an inert atmosphere away from oxygen and moisture.

EXAMPLE 2

Coupling of N-(4-Chloro-2-benzoylphenyl)succinimide using a nickel catalyst comprising tri(2-methylphenyl) phosphite A solution of anhydrous nickel chloride (49 mg, 0.38 mmol), sodium iodide (300 mg, 2 mmol), tri(2-methylphenyl) phosphite (370 mg, 1.05 mmol) and N-(4-chloro-2-benzoylphenyl) succinimide (2.79 g, 8.9 mmol) in NMP (7 ml) was prepared in a glovebox and then stirred at 60° C. for 3 hours. Activated zinc dust (1.6 g, 24.6 mmol) prepared in accordance with the procedure of Example 1 was added to the homogeneous green solution under helium. The mixture was stirred at 60° C. for 13 hours at 80° C. for another 6 hours. The reaction mixture was poured into 50 ml of water and filtered. The solid was collected by filtration and then stirred in 20 ml of methanol for 2 hours. The suspension was filtered and the cake was washed in the funnel with methylene chloride. Most of the solid dissolved and the solvent in the filtrate was evaporated. The solid was stirred in methanol and filtered to give pure coupling product as crystals. The crystals were air-dried to give 2.02 g 3,3'-dibenzoyl-4,4'-succinimidobiphenyl (82%).

EXAMPLE 3

Coupling Reaction of 4-Chlorotoluene using a nickel catalyst comprising tri(2-methylphenyl) phosphite A mixture of anhydrous nickel chloride (50 mg, 0.39 mmol), sodium iodide (300 mg, 2 mmol), tri(2-methylphenyl)phosphite (300 mg, 0.85 mmol) in NMP (5 ml) was prepared in a glovebox and then stirred at 60° C. for 1 hour 50 minutes. To the resulting green solution was added activated zinc dust (1.5 g, 23 mmol) prepared in accordance with the procedure of Example 1 under helium. The mixture was stirred at 60° C. and 4-chlorotoluene (1 g, 7.9 mmol) was added. After 17 hours, the reaction temperature was raised to 80° C. and the mixture was stirred for another 7 hours. 4,4'-dimethylbiphenyl was obtained in 97% yield by gas chromatography analysis of the reaction mixture. The GC retention time of the dimer was the same as that of dimer obtained using a literature coupling method.

EXAMPLE 4

Coupling Reaction of 2-Chlorobenzophenone using a nickel catalyst comprising tri(2-methylphenyl) phosphite A mixture of anhydrous nickel chloride (50 mg, 0.39 mmol), sodium iodide (300 mg, 2 mmol), tri(2-methylphenyl)phosphite (340 mg, 0.97 mmol), 2-chlorobenzophenone (1.01 g, 4.7 mmol) and zinc chloride (1 g, 7.4 mmol) in NMP (8 ml) was prepared in a glovebox and then stirred at 60° C. for 1 hour. To the solution was added activated zinc dust (1.5 g, 23 mmol) prepared in accordance with the procedure of Example 1 under helium. The mixture was stirred at 60° C. for 13 hours. 2,2'-dibenzoylbiphenyl was obtained quantitatively based on GC analysis. The GC retention time of the dimer was the same as that of dimer obtained using a literature coupling method.

EXAMPLE 5

Coupling of 2-Chlorobenzophenone using a nickel catalyst comprising triphenyl phosphite A solution of anhydrous nickel chloride (50 mg, 0.39 mmol), sodium iodide (300 mg, 2 mmol), triphenylphosphite (250 mg, 0.81 mmol), 2-chlorobenzophenone (1.01 g, 4.7 mmol) in NMP (5 ml) was prepared in a glovebox and then stirred at 70° C. for 2 hours. To the solution was added activated zinc dust (1.6 g, 25 mmol) prepared in accordance with the procedure of Example 1 under helium. It was stirred at 70° C. for 13 hours. 2,2'-Dibenzoylbiphenyl was obtained in 96% yield based on GC analysis. The GC retention time of the dimer was the same as that of dimer obtained using a literature coupling method.

EXAMPLE 6

Polymerization of 2,5-Dichlorobenzophenone Using A Nickel Catalyst Comprising Tri(2-methylphenyl)phosphite A solution of anhydrous nickel chloride (47 mg, 0.36 mmol), sodium iodide (150 mg, 1 mmol), tri(2-methylphenyl)phosphite (700 mg, 1.99 mmol) and 2,5-dichlorobenzophenone (1.2 g, 4.8 mmol) in NMP (5 ml) was prepared in a glovebox and then stirred at 90° C. for 40 minutes. Activated zinc dust (1.5 g, 23 mmol) prepared in accordance with the procedure of Example 1 was added to the homogeneous green solution under helium. The mixture was stirred at 90° C. for 36 hours and then cooled to room temperature. The viscous solution was poured into 1 M HCl in ethanol. The solid was collected by filtration and was stirred in acetone for further purification. The polymer was obtained in 92% yield (0.79 g) after filtration and drying. Size exclusion chromatography (SEC) of the polymers relative to narrow polydispersity polystyrene standards, for dilute solutions of the polymer in NMP including 0.05 molar lithium bromide, indicated a weight average molecular weight of 14,319.

EXAMPLE 7

Coupling of 4-Chlorotoluene using a nickel catalyst comprising Tri(2-phenylphenyl)phosphite A solution of nickel chloride (50 mg, 0.39 mmol), sodium iodide (300 mg, 2 mmol), tri(2-phenylphenyl)phosphite (524 mg, 0.97 mmol) and 4-chlorotoluene (1 g, 7.9 mmol) in NMP (5 ml) was prepared in a glovebox and then stirred at 70° C. for 2 hours. Activated zinc dust (1.6 g, 25 mmol) prepared in accordance with the procedure of Example 1 was added to the solution under helium. The mixture was stirred at 60° C. for 13 hours. Dimethylbiphenyl was obtained in 99% yield based on GC analysis. The GC retention time of the dimer was the same as that of dimer obtained using a literature coupling method.

EXAMPLE 8

Coupling of 2-Chlorobenzophenone using a nickel catalyst comprising tri(2-phenylphenyl) phosphite A solution of anhydrous nickel chloride (25 mg, 0.19 mmol), sodium iodide (60 mg, 0.39 mmol), tri(2-phenylphenyl)phosphite (262 mg, 0.49 mmol), 2-chlorobenzophenone (2 g, 9.3 mmol) in NMP (5 ml) was prepared in a glovebox and then stirred at 60° C. for 2 hour. To the solution was added activated zinc dust (0.75 g, 11.7 mmol) prepared in accordance with the procedure of Example 1 under helium. It was stirred at 60° C. for 11 hours. 2,2'-Dibenzoylbiphenyl was obtained in 99% yield based on GC analysis. The GC retention time of the dimer was the same as that of dimer obtained using a literature coupling method.

EXAMPLE 9

Coupling of 3-Chlorobenzophenone using a nickel catalyst comprising tri(2-phenylphenyl) phosphite A solution of anhydrous nickel chloride (50 mg, 0.39 mmol), sodium iodide (300 mg, 2 mmol), tri(2-phenylphenyl)phosphite (524 mg, 0.98 mmol), 3-chlorobenzophenone (2 g, 9.3 mmol) in NMP (5 ml) was prepared in a glovebox and then stirred at 60° C. for 2 hours. To the solution was added activated zinc dust (1.4 g, 21.5 mmol) prepared in accordance with the procedure of Example 1 under helium. It was stirred at 60° C. for 4 hours. 3,3'-dibenzoylbiphenyl was obtained in 97% yield based on GC analysis. The GC retention time of the dimer was the same as that of dimer obtained using a literature coupling method.

EXAMPLE 10

Coupling of 4-Chlorotoluene using a nickel catalyst comprising Tri(2-methoxyphenyl)phosphite A solution of nickel chloride (50 mg, 0.39 mmol), sodium iodide (300 mg, 2 mmol), and tri(2-methoxyphenyl)phosphite (360 mg, 0.9 mmol) in NMP (5 ml) was prepared in a glovebox and then stirred at 60° C. for 1.5 hours. Activated zinc dust (1.6 g, 25 mmol) prepared in accordance with the procedure of Example 1 was added to the solution under helium followed by 4-chlorotoluene (1 g, 7.9 mmol). The mixture was stirred at 60° C. for 30 hours and at 80° C. for another 15 hours. Dimethylbiphenyl was obtained in 99% yield based on GC analysis. The GC retention time of the dimer was the same as that of dimer obtained using a literature coupling method.

EXAMPLE 11

Coupling of 2-Chlorobenzophenone using a nickel catalyst comprising tri(2-methylphenyl) phosphite A solution of anhydrous nickel chloride (50 mg, 0.39 mmol), sodium iodide (300 mg, 2 mmol), tri(2-methoxyphenyl)phosphite (360 mg, 0.9 mmol), 2-chlorobenzophenone (1.2 g, 5.6 mmol) in NMP (5 ml) was prepared in a glovebox and then stirred at 60° C. for 2 hour. To the solution was added activated zinc dust (1.4 g, 21.5 mmol) prepared in accordance with the procedure of Example 1 under helium. It was stirred at 60° C. for 12 hours. 2,2'-Dibenzoylbiphenyl was obtained in 97% yield based on GC analysis. The GC retention time of the dimer was the same as that of dimer obtained using a literature coupling method.

EXAMPLE 12

Coupling of 4-Chlorotoluene using a nickel catalyst comprising Tri(2-tert-butylphenyl)phosphite A solution of anhydrous nickel chloride (50 mg, 0.39 mmol), sodium iodide (310 mg, 2.07 mmol), and tri(2-tert-butylphenyl)phosphite (508 mg, 0.97 mmol) in NMP (5 ml) was prepared in a glovebox and then stirred at 60° C. for 1.5 hours. Activated zinc dust (1.5 g, 23 mmol) prepared in accordance with the procedure of Example 1 was added to the solution under helium followed by 4-chlorotoluene (1 g, 7.9 mmol). The mixture was stirred at 60°–65° C. for 15 hours. Dimethylbiphenyl was obtained in 99% yield based on GC analysis. The GC retention time of the dimer was the same as that of dimer obtained using a literature coupling method.

EXAMPLE 13

Preparation of 6-chloro-2-(4-fluorophenyl)-4-phenylquinoline

A three-necked, 2 L round-bottomed flask equipped with a thermometer, a mechanical stirrer and a distillation unit fitted with a nitrogen inlet valve was charged with 2-amino-5-chlorobenzophenone (695.0 g, 3.00 mol), and 4'-fluoroacetophenone (456.0 g, 3.30 mol), p-tosic acid (47.62 g, 0.25 mol). The reaction mixture was heated under nitrogen at 165° C. (44 h). The yellow 4'-acetophenone that co-distilled with the water was separated and reintroduced to the reaction mixture throughout the heating period. The mixture was further heated to 190° C. (2 h). The mixture was cooled to 120° C. and was poured into 95% ethanol (10 L) while vigorously stirring with a mechanical stirring rod set up. The mixture was filtered and the precipitate was washed with ethanol (1 L). The solid was dried in a vacuum oven at 80° C. (16 h). Yield 969 g, 97%; mp 141.0°–142.1° C.

EXAMPLE 14

Preparation of 6,6'-bis[2-(4-fluorophenyl)-4-phenylquinoline]

A three-necked, 22 L round-bottomed flask equipped with a mechanical stirred, a thermometer, and a nitrogen inlet was charged with nickel chloride (27.38 g, 0.211 mol), tris(2-tolyl)phosphite (230.7 g, 0.655 mol), sodium iodide (167.8 g, 1.12 mol), 6-chloro-2-(4-fluorophenyl)-4-phenylquinoline (1713 g, 5.13 mol), and NMP (4.32 L). The mixture was heated to 80° C. under nitrogen (24 h). The temperature of the reaction was lowered to 60° C. and zinc (455.7 g, 6.97 mol) was added. The reaction exothermed to 95° C., with the aid of a cooling bath for temperature control. The mixture was stirred again at 80° C. (24 h). The mixture was heated further to 160° C. until all of the solids had dissolved and was then filtered hot through Celite. The mother liquor was cooled to room temperature, the crude product was collected by filtration, and the crude product was washed with methanol (4 L). The solid was dissolved in DMF (20 L) and subjected to another hot filtration through Celite. The yellow crystals that formed in the DMF filtrate were collected by filtration and washed with methanol (2 L). The solid was dried in a vacuum oven at 120° C. (16 h). Yield 1147 g, 74.9%.

EXAMPLE 15

Preparation of 6,6'-bis[2-(4-fluorophenyl)-4-phenylquinoline]in a single pot from 2-amino-5-chlorobenzophenone and 4'-fluoroacetophenone A 250 mL, three-necked, round-bottomed flask fitted with a mechanical stirring set-up, a short path distillation apparatus, and a nitrogen inlet valve was charged with 2-amino-5-chlorobenzophenone (Compound 3) (17.4 g, 75.0 mmol), 4'-fluoroacetophenone (Compound 2) (10.0 mL, 824 mmol), and tosic acid (0.505 g, 2.7 mmol). the reaction was heated under nitrogen at 180° C. (20 h) to effect condensation and water removal. The temperature of the reaction was lowered to 160° C., and potassium carbonate (0.367 g, 2.7 mmol) was added. Toluene (100 mL) was then added to the reaction and distilled away. This toluene addition/distillation was repeated two times.

The temperature of the reaction was lowered to 80° C., and the distillation unit was removed. The flask was charged with nickel chloride (0.778 g, 6.00 mmol), sodium iodide (2.43 g, 16.2 mmol), tris(2-tolyl)phosphite (6.77 g, 19.2mmol), and NMP (63 mL), and the resulting solution was stirred (18 h). The reaction temperature was then lowered to 60° C., and activated zinc dust (6.59 g, 101 mmol) was added. After the exotherm had subsided (10 min), the reaction was allowed to stir at 80° C. (16 h).

The temperature of the reaction was raised to 160° C. to dissolve the precipitate which had formed. The reaction mixture was filtered while hot through Celite and was allowed to cool to room temperature. The crude product was collected by filtration and was washed with ethanol. A second crop was collected from the mother liquor and was washed with ethanol. The yellow product was dried in a vacuum oven at 160° C. (18 h). 12.0 g from Crop 1 and 6.3 g from Crop 2 (Yield 73.1%).

In a second embodiment aryl sulfonates are coupled to biaryls and aryl disulfonate are coupled to polyaryls using the same nickel phosphite catalyst and conditions as for aryl halides. Thus, anhydrous dipolar aprotic solvents such as NMP, DMF, and DMAC are suitable. The reducing agents may be reducing metals such as aluminum, calcium, magnesium, manganese, zinc and their alloys. The reaction temperatures are from 25° C. to 150° C., preferably 50° C. to 100° C., and more preferably from 75° C. to 90° C. The reaction times are from 1 to 72 hours, preferably from 2 to 24 hours and more preferably from 4 to 16 hours. The phosphite ligand to nickel molar ratio should be from about 2:1 to about 4:1. The aryl halide to nickel ratio should be from about 10:1 to about 10,000:1, preferably from about 20:1 to about 1000:1, more preferably from about 25:1 to 100:1, and most preferably from about 40:1 to about 80:1.

The above descriptions of various embodiments of processes for coupling aryl halides or aryl sulfonates to produce biaryls or polyaryls and the catalyst compositions useful for such coupling reactions are provided for illustrative purposes. Because of variations which will be apparent to those skilled in the art, the present invention is not intended to be limited to the particular embodiments described above. Additionally, it should be understood that any compounds or compositions that are not described in the application as being useful for practicing the invention, are not needed and the invention can be practiced in their absence.

The scope of the invention is defined in the following claims.

What is claimed is:

1. A method of coupling aryl halides to form biaryl or polyaryl compounds, the method comprising the steps of:

providing an aryl halide selected from the group consisting of an aryl chloride, an aryl bromide, and an aryl iodide; and mixing the aryl halide in an anhydrous aprotic solvent with a nickel compound or nickel complex, a phosphite ligand, and a reducing metal to thereby form said biaryl or polyaryl compound.

2. The method according to claim 1, wherein a promoter selected from the group consisting of chloride, bromide, and iodide salts is also mixed with the aryl halide.

3. The method according to claim 2, wherein the promoter is sodium iodide.

4. The method according to claim 2, wherein the promoter is sodium bromide.

5. The method according to claim 2, wherein the chloride, bromide, and iodide ions are introduced as salts selected from the group consisting of alkali salts, alkaline earth salts, alkylammonium salts, aluminum salts, manganese salts, and zinc salts.

6. The method according to claim 1, wherein the phosphite ligand to nickel molar ratio is in the range of 2 to 10.

7. The method according to claim 1, wherein the phosphite ligand to nickel molar ratio is in the range of 2.4 to 5.

8. The method according to claim 1, wherein the reducing metal is selected from the group consisting of aluminum, calcium, magnesium, manganese, zinc, alloys of aluminum, calcium, magnesium, manganese, and zinc, and mixtures thereof.

9. The method according to claim 1, wherein the aryl halide has the formula:

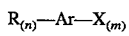

wherein X is independently selected from the group consisting of Cl, Br, I, m is 1 or 2, and n is 0–10;

Ar is selected from the group consisting of:

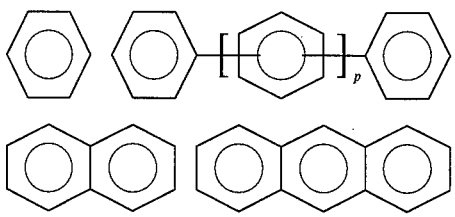

and the aryl halide has the formula:

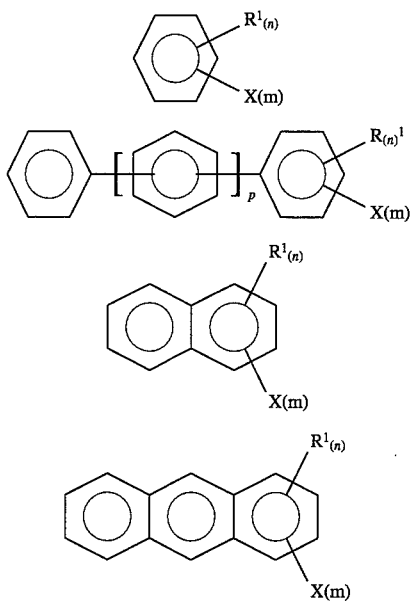

wherein p is 0–100;

R is independently alkyl, alkene, aryl, alkoxy, aryloxy, amine, amide, fluoroalkyl, fluoroaryl, alkyl ketone, aryl ketone, ester, formyl, cyano, fluoro, imide, sulfone, and thioether;

wherein X and R can be on any of the fused or multiple rings;

wherein one to three CH units in any aromatic ring of each such Ar group can be replaced by a nitrogen atom, and where m=2, the two halides are at positions other than ortho to each other.

10. The method according to claim 9, wherein the aryl halide includes two halide groups para to each other.

11. The method according to claim 10, wherein the phosphite ligand is selected from the group consisting of:

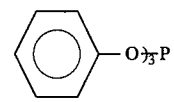

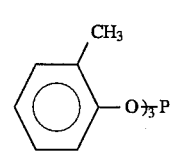

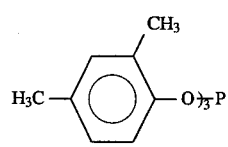

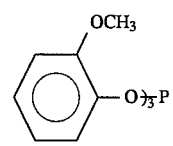

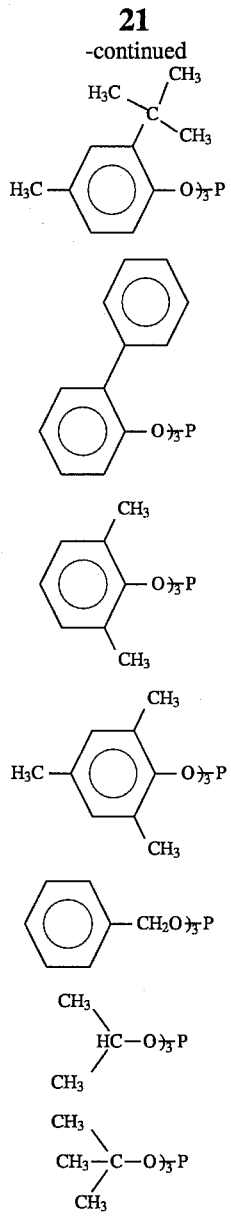

12. The method according to claim 1 wherein the aryl halide is

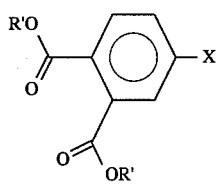

wherein X is selected from the group consisting of Cl, Br, and I; and R' is alkyl or aryl.

13. The method according to claim 1, wherein the aryl halide includes two halide groups.

14. The method according to claim 13, wherein $R^2$, $R^3$, and $R^4$ are independently selected from the groups consisting of

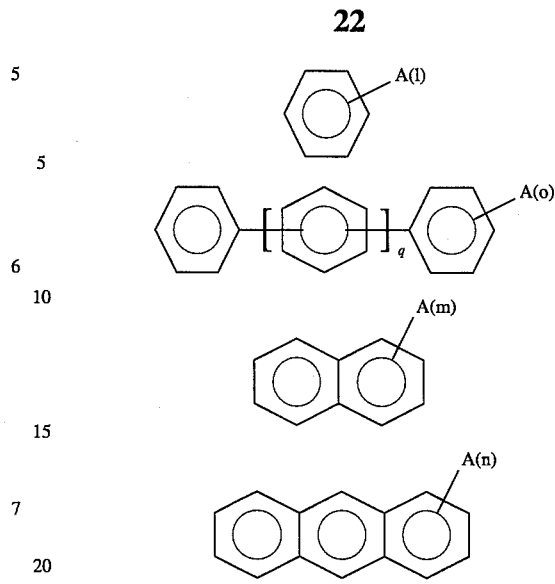

wherein A is independently selected from the group consisting of $C_1$–$C_{22}$ alkyl, $C_6$–$C_{18}$ aryl, $C_1$–$C_{12}$ alkoxy, $C_6$–$C_{18}$ aryloxy, and F, and wherein l=0–5, m=0–7, n=0–9, and o=0–21; the A groups can be on any of the fused or multiple rings; and q=0–3.

15. The method according to claim 1, wherein the aryl halide has the formula:

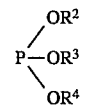

wherein X is independently selected from the group consisting of Br, Cl, and I; $R^1$ is independently alkyl, alkene, aryl, alkoxy, aryloxy, amine, amide, fluoroalkyl, fluoroaryl, alkyl ketone, aryl ketone, ester, formyl, cyano, fluoro, imide, sulfone, and thioether; the X halides are para to each other; and n=0–4.

16. The method according to claim 1, wherein the phosphite ligand has the formula:

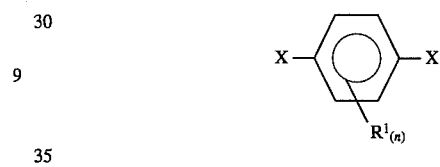

wherein $R^2$, $R^3$, and $R^4$ are independently selected from the group consisting of $C_3$ to $C_{22}$ alkyl, $C_6$ to $C_{24}$ aryl, alkaryl, and aralkyl.

17. The method according to claim 1, wherein the phosphite ligand is:

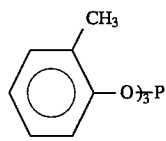

the nickel compound is nickel (II) chloride, and the reducing metal is zinc.

18. The method according to claim 1, wherein the aryl halide is 2,5 dichlorobenzophenone, the nickel compound is nickel (II) chloride, the phosphite is tri(2-methylphenyl)phosphite, the reducing metal is zinc, and the aprotic solvent is selected from the group consisting of N-methylpyrrolidinone (NMP), N,N-dimethylacetamide, N-cyclohexylpyrrolidinone, dimethylformamide, and N,N,N,N-tetramethylurea.

19. The method according to claim 1, wherein the aryl halide is N- (4-chloro-2-benzoylphenyl)succinimide, the aprotic solvent is NMP, the nickel compound is nickel (II) chloride, the phosphite is tri (2-methylphenyl) phosphite, and the reducing metal is zinc.

20. The method according to claim 1, wherein the aryl halide is 4-chlorotoluene, the aprotic solvent is NMP, the nickel compound is nickel (II) chloride, the phosphite is tri(2-methylphenyl)phosphite, and the reducing metal is zinc.

21. The method according to claim 1, wherein the aryl halide is 2-chlorobenzophenone, the aprotic solvent is NMP, the nickel compound is nickel (II) chloride, the phosphite is tri(2-methylphenyl)phosphite, and the reducing metal is zinc.

22. The method according to claim 1, wherein the aprotic solvent is an amide solvent selected from the group consisting of N-methylpyrrolidinone, N,N-dimethylacetamide, N-cyclohexyl-pyrrolidinone, and dimethylformamide.

23. The method according to claim 1, wherein the nickel compound is selected from the group consisting of nickel (II) chloride and nickel (II) bromide.

24. The method according to claim 1, wherein the phosphite ligand is an aryl phosphite.

25. The method according to claim 1, wherein the phosphite ligand is tri-2-tolylphosphite.

26. The method according to claim 1, wherein the phosphite ligand is triphenylphosphite.

27. The method according to claim 1, wherein the phosphite ligand is tri-(2,4-dimethylphenyl)phosphite.

28. The method according to claim 1, wherein the phosphite ligand is tri-(2-methoxyphenyl)phosphite.

29. The method according to claim 1, wherein the phosphite ligand is tri-(2-tert-butyl-4-methylphenyl)phosphite.

30. The method according to claim 1, wherein the phosphite ligand is tri-(2-phenylphenyl)phosphite.

31. The method according to claim 1, wherein the aryl halide is 6-chloro-2-(4-fluorophenyl)-4-phenylquinoline.

32. The method according to claim 1, wherein the aryl halide is a protected form of 2-amino-4-chlorobenzophenone.

33. The method according to claim 1, wherein the aryl halide is 4-chloroacetophenone.

34. The method according to claim 1, wherein the aryl halide is an aryl dihalide.

35. The method according to claim 1, wherein the aryl halide is 2,5-dichlorobenzophenone.

36. The method according to claim 1, wherein the aryl halide is 2,5-dichloro-4'-phenoxybenzophenone.

37. The method according to claim 1, wherein the aryl halide is 2,5-dichlorobiphenyl.

38. The method according to claim 1, wherein the aryl halide is 2,4-dichlorobenzophenone.

39. The method according to claim 1, wherein the aryl halide is provided as a mixture of aryl dihalides, and the polyaryl product is a polyarene co-polymer.

40. The method according to claim 39, wherein one of the aryl dihalides has the formula:

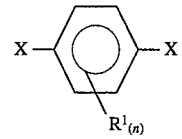

wherein X is independently selected from the group consisting of Br, Cl, and I; $R^1$ is independently alkyl, alkene, aryl, alkoxy, aryloxy, amine, amide, fluoroalkyl, alkyl ketone, aryl ketone, ester, formyl, cyano, fluoro, imide, sulfone, and thioether; the X halides are para to each other; and n=0–4.

41. The method according to claim 1, wherein a mixture of two or more aryl halides is coupled.

42. A method of coupling aryl halides to form biaryl or polyaryl compounds, the method comprising the steps of:

providing an aryl halide selected from the group consisting of an aryl chloride, an aryl bromide, an aryl iodide and mixtures thereof; and mixing the aryl halide in an anhydrous aprotic solvent with a nickel compound or nickel complex, a ligand selected from the group consisting of:

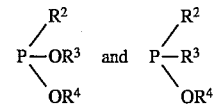

wherein $R^2$, $R^3$, and $R^4$ are independently selected from the group consisting of $C_3$ to $C_{22}$ alkyl, $C_6$ to $C_{24}$ aryl, alkaryl, and aralkyl, and a reducing metal to thereby form said biaryl or polyaryl compound.

43. A method of coupling aryl halides to form biaryl or polyaryl compounds, the method comprising the steps of:

providing an aryl halide selected from the group consisting of an aryl chloride, an aryl bromide, and an aryl iodide;

mixing together the aryl halide, a nickel compound or nickel complex and a phosphite ligand in an anhydrous aprotic solvent containing an electrolyte;

placing the mixture in an electrochemical cell comprising a cathode; and cathodically reducing the aryl halide to thereby form said biaryl or polyaryl compound.

44. A method of coupling aryl halides or aryl sulfonates to form biaryl or polyaryl compounds, the method comprising the steps of:

providing an aryl halide or aryl sulfonate selected from the group consisting of an aryl chloride, an aryl bromide, an aryl iodide, an aryl methanesulfonate, an aryl phenylsulfonate, an aryl tolylsulfonate, an aryl trifluoromethanesulfonate, an aryl fluorophenylsulfonate, and an aryl fluorosulfonate,; and mixing the aryl halide or aryl sulfonate in an anhydrous aprotic solvent with a nickel compound or nickel complex, a phosphite ligand, and a reducing metal to thereby form said biaryl or polyaryl compound.

* * * * *

UNITED STATES PATENT AND TRADEMARK OFFICE
CERTIFICATE OF CORRECTION

PATENT NO. : 5,602,228            Page 1 of 2
DATED : February 11, 1997
INVENTOR(S) : Ying Wang; Matthew L. Marrocco, III; Mark S. Trimmer It is certified that error appears in the above-indentified patent and that said Letters Patent is hereby corrected as shown below:

On the title page, item 54, the title should read -- NICKEL PHOSPHITE CATALYSTS --.
Column 1, line 1, the title should read -- NICKEL PHOSPHITE CATALYSTS --.
Column 1, line 21, change "Chem. Left." to -- Chem. Lett. --.
Column 1, line 57, after "formation" replace "f" with -- of --.
Column 3, line 55, change "qauinolines" to -- quinolines --.
Column 5, line 42, change "NIL$_3$" to -- NiL$_3$ --.
Column 5, line 59, change "NIL$_4$" to -- NiL$_4$ --
Column 13, line 13, change "ma/cm$^2$" to -- mA/cm$^2$ --.
Column 13, line 14, change "ma/cm$^2$" to -- mA/cm$^2$ --.
Column 13, line 15, change "ma/cm$^2$" to -- mA/cm$^2$ -- (both occurrences).
Column 14, line 22, replace "100 14 200°C" with -- 100-200°C --.
Column 16, line 26, change "2 hour" to -- 2 hours --.
Column 17, line 10, change "2 hour" to -- 2 hours --.
Column 17, line 61, change "stirred" to -- stirrer --.

UNITED STATES PATENT AND TRADEMARK OFFICE
CERTIFICATE OF CORRECTION

PATENT NO. : 5,602,228

DATED : February 11, 1997

INVENTOR(S) : Ying Wang, et al

It is certified that error appears in the above-identified patent and that said Letters Patent is hereby corrected as shown below:

Column 18, line 26, change "the" to --The--.

Signed and Sealed this

Tenth Day of February, 1998

*Attest:*

BRUCE LEHMAN

*Attesting Officer*      *Commissioner of Patents and Trademarks*